US006574737B1

(12) United States Patent
Kingsford et al.

(10) Patent No.: US 6,574,737 B1
(45) Date of Patent: Jun. 3, 2003

(54) SYSTEM FOR PENETRATING COMPUTER OR COMPUTER NETWORK

(75) Inventors: Bryan Kingsford, Orem, UT (US); Stan McQueen, Orem, UT (US); Woody Thrower, Prove, UT (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/220,125

(22) Filed: Dec. 23, 1998

(51) Int. Cl.[7] ................................................ G06F 11/30
(52) U.S. Cl. ....................................... 713/201; 709/224
(58) Field of Search ................................. 713/200, 201, 713/164, 165, 167, 194; 709/217, 218, 219, 227, 223, 224, 228, 229; 714/33, 37, 39

(56) References Cited

U.S. PATENT DOCUMENTS

| 5,557,742 | A | | 9/1996 | Smaha | |
|---|---|---|---|---|---|
| 5,892,903 | A | * | 4/1999 | Klaus | 713/201 |
| 5,931,946 | A | * | 8/1999 | Terada et al. | 713/201 |
| 5,991,881 | A | * | 11/1999 | Conklin et al. | 713/201 |
| 6,088,804 | A | * | 7/2000 | Hill et al. | 713/201 |
| 6,154,844 | A | * | 11/2000 | Touboul et al. | 713/201 |
| 6,185,689 | B1 | * | 2/2001 | Todd, Sr. et al. | 713/201 |
| 6,219,805 | B1 | * | 4/2001 | Jones et al. | 714/38 |
| 6,321,338 | B1 | * | 11/2001 | Porras et al. | 713/201 |
| 6,353,385 | B1 | * | 3/2002 | Molini et al. | 340/506 |
| 6,484,203 | B1 | * | 11/2002 | Porras et al. | 709/224 |

FOREIGN PATENT DOCUMENTS

WO PCT/US99/09454 11/1999

OTHER PUBLICATIONS

"The Internet Scanner User Guide", Internet Security Systems, Inc., Version 5.2, pp. 3,4,32,38,43–45,48,56,58,59, 1997.*
Intellitactics, Inc. print out of Internet page "www.intellitactics.com" Last update on Sep. 22, 1999 Printed on Sep. 30, 1999.

(List continued on next page.)

Primary Examiner—Norman M. Wright
Assistant Examiner—Christopher Revak
(74) Attorney, Agent, or Firm—Gunnison, McKay & Hodgson, L.L.P.; Serge J. Hodgson

(57) ABSTRACT

A computer network penetration test discovers vulnerabilities in the network using a number of scan modules. The scan modules perform their scanning of the network separately but in parallel. A scan engine controller oversees the data fed to and received from the scan modules, and controls the sharing of information among the modules according to data records and configuration files that specify how a user-selected set of penetration objectives should be carried out. The system allows for penetration strategies to be attempted simultaneously and independently. Information from each strategy is shared with other strategies so each can be more effective, and together they form a very comprehensive approach to network penetration. The strategies can be throttled at different levels to allow for those that are more likely to achieve success to run at the highest speeds. While most strategies collect information from the network, at least one dedicated one analyzes the data produced by the others according to a series of rules. This analysis reduces and refines data and simplifies the design of the various strategies. Data obtained through the various strategies are stored in such a way that new data types can be stored and processed without all the strategies having to be adjusted. Strategies are run according to whether or not they can help in achieving a specified objectives. The vulnerability scan is initiated by a user who specifies what targeted network resources to scan. From that point on, the scan is data driven and models how an unwanted attacker would gain unauthorized access to the system.

22 Claims, 4 Drawing Sheets

OTHER PUBLICATIONS

The Proverbial Hack Button—Artificial Intelligence Powered Hacking Combined with a Structured Methodology 26th Annual Computer Security Conference and Exhibition Manual "Shape Your Destiny" Nov. 15–17, 1999 p. 17 col. E7.

ISS Brings Power and Intellegence to Security Assessment With NE Dec. 16, 1998 Atlanta (Business Wire).

SmartScan–Internet Scanner 5.6 Dec. 7, 1998.

"A Software Platform for Testing Intrusion Detection Systems" Puketza N, et al. Database Inspec 'Online Oct. 1997 pp. 46, 48 and 50.

"Product Leaders, Plugging Security Holes, Netect's Netective Simulates Hacker Attacks, Letting Corporate Networks Shore Up Weak Spots" Bruno L. Data Communications, US, McGraw Hill. New York, vol. 27 No. 2 Feb. 1, 1998 pp. 29–30.

"Simulated Attach for Real Network Security" Johnson J T. Data Communications, US, McGraw Hill. New York, vol. 24, No. 16 Nov. 21, 1995, pp. 31–32.

* cited by examiner

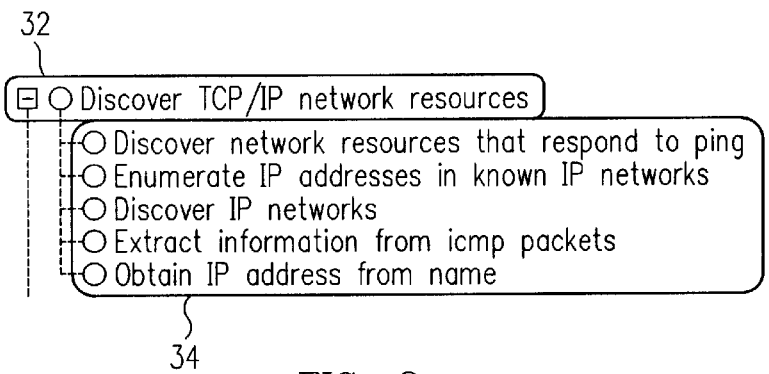

FIG. 3

R Name="Discover network resources that respond to ping"
Parent="Discover TCP/IP network resources"
Command="Ping"
Filter="R Type=!IP host!"
Met="R Vulnerability=!responds to ping!"
Try If="Discover TCP/IP network resources"
Try="Extract information from icmp packets"

FIG. 4

R Network Resource="205.159.112.113"
Service="qotd"
Protocol="TCP"
Port="17"
Miscellaneous=!Connect response="Here's the rule for bargains:
"Do other men, for they would do you."\r\n That's the true business precept." Charles Dickens (1812-70)\r\n!
Command="TCPScan -b 7-25 53 79 111 512-514 5600-5601 3823 5052"
Severity="0"

FIG. 6

R Name="Discover systems vulnerable to latest NT exploit"
Parent="My company's custom vulnerabilities"
Command="Oof"
Filter="R Type=!WNet!"
Met="R Vulnerability=!latest exploit possible!"
Try If="Discover Windows network resources"

FIG. 7

R Name="Obtain access through login server" Parent="Obtain access to TCP/IP network resources" Command="RLogin" Sound="applause.wav" Met="R Service=!login! Password=!*!" Filter="R Vulnerability=!login service enabled!" Filter="R Login Name=!*! Password=!*!" Try If="Discover login servers" Try If="Obtain encrypted passwords from nis"

FIG. 8

R Network Resource="205.159.112.238" Protocol="TCP" Port="80" Miscellaneous="Connect response=HTTP/1.0 200 OK\r\nServer: Netscape-FastTrack/2.0f\r\nDate: Wed, 11 Feb 1998 23:17:12 GMT\r\nContent-type: text/html\r\n\r\n" Command=!TCPScan -bs "HEAD / HTTP/1.0\r\n\r\n" 80! Severity="0"

FIG. 9

SYSTEM FOR PENETRATING COMPUTER OR COMPUTER NETWORK

The present invention is directed to a method, apparatus, system, article of manufacture, and/or signal for penetrating a computer or computer network, and in particular for finding network vulnerabilities which should be corrected.

BACKGROUND OF THE INVENTION

Computer networks are often vulnerable to unwanted attackers who can find out about, access, and interrupt service. When attempting to make a computer or computer network secure against unauthorized access, it is common to hire someone to perform penetration tests. These persons, sometimes referred to as tiger teams, execute a variety of strategies in an attempt to gain control of systems within the computer or network, to access data, and to determine which parts of the computer or network are vulnerable to attack. They generally begin without any "key" or other access to the network, so they must discover vulnerabilities in much the same way as the unwanted computer hacker.

As an example, an imaginary tiger team may include Joe, Fred, and Mark, each of whom is expert in a specific system with a computer network. For example, Joe is knowledgeable with Windows NT, Fred knows UNIX systems, and Mark is familiar with NetWare. These are some of the common operating systems found in today's computer networks. The team is hired to test a company's network, meaning that they are asked to break into the network and produce a report on their results. They first gather as much information as possible about the network, hopefully learning the type of operating system that each computer in the network uses, which can be most useful. Once these and other systems are identified, each member of the tiger team goes after the type of machine they know best.

Mark may be first to achieve success. By accessing an improperly configured NetWare system, he is able to download its bindery, then crack an ill-chosen password and obtain the login name on the account. He tells Joe and Fred the login name and password to see if they have any luck with it. This is because the same user sometimes uses the same name and password on multiple systems. Sure enough, Joe is able to use the name and password that Mark stole from the NetWare system to access three different UNIX systems. The success and efficiency of the tiger team, however, is low because of the independent nature of each team member's contribution. In other words, only minimal information is shared between the team members, thus resulting in poor penetration tests.

Even automated penetration software such as ISS Group's Internet Security Scanner and Secure Network's Ballista fall short of tiger team effectiveness. These automated tests decrease the labor cost of manual penetration tests, but they execute a variety of probes serially and independently in order to determine what vulnerabilities each computer has. They employ attack strategies at only one "level" of penetration, meaning that if they run a number of penetration strategies, they are all run in series and independently without any strategy benefiting from the success of other strategies.

The need for a better solution for penetration testing is constantly growing relative to the number of businesses using networked computers. Network computing has provided a significant leap forward in the computer industry, and in the possibilities for information flow, but at the same time it has created a tremendous number of security problems.

BRIEF SUMMARY OF THE INVENTION

Accordingly, it is an object of the present invention to exceed the effectiveness of a team of information security experts who conduct network penetration tests, and at a cost which makes frequent tests more practical.

Another object of the present invention is to provide faster penetration by using weaknesses discovered in one system to break into other systems.

Yet another object of the present invention is to provide a more effective penetration test, having higher accuracy. The present invention can rate vulnerabilities more accurately as medium or high risks, instead of low risks, because of its improved ability to invade a computer or network.

The present invention overcomes the inefficiencies of the prior art by offering a package that runs several types of penetration or break-in techniques automatically and in parallel, with the modules feeding their individual results to other modules in order to improve the overall penetration test. This "multi-level" approach is more than simply a parallel processing scheme since it can establish both hierarchies and priorities among the techniques to be run, and it can decide which information to share, thereby improving penetration efficiency and effectiveness.

These and other objects are achieved by providing a computer network penetration test system, comprising a plurality of scan modules for scanning a computer to learn vulnerabilities that the computer has to unwanted access, at least one of said scan modules producing an output based on a scan of the computer, and at least one other of said scan modules requiring an input before performing a network scan operation; a controller for instructing said one scan module to perform a scan of the computer and for producing said input to said one other scan module based on said output.

These and other objects are also achieved by providing a method of performing a penetration test on a computer network, comprising performing a first computer network scan to gather information about a secured network resource in the computer network; performing a second computer network scan to gather information about a second secured network resource in the computer network; and automatically sharing output data from the first computer network scan with the second computer network scan.

These and other objects can also be achieved by providing an article of manufacture bearing a machine readable program for carrying out the steps of scanning a computer network using a plurality of scan modules; and automatically sharing information from at least one of the scan modules to at least one other of the scan modules.

Further scope of applicability of the present invention will become apparent from a review of the detailed description and accompanying drawings. It should be understood that the description and examples, while indicating preferred embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and thus are not to be construed as limiting the scope of the present invention. In the drawings:

FIG. 3 shows an example of a penetration objective hierarchy shown on a user interface according to an embodiment of the present invention.

FIG. 4 shows an example of a record for a penetration objective according to an embodiment of the present invention.

FIG. 6 shows an example of an output data record produced by a scan module according to an embodiment of the present invention.

FIG. 7 shows another example of a record for a penetration objective according to an embodiment of the present invention.

FIG. 8 shows yet another example of a record for a penetration objective according to an embodiment of the present invention.

FIG. 9 shows an example of a scan data record produced by a scan module or a data processor according to an embodiment of the present invention.

DETAILED DESCRIPTION OF THE PREFERRED EMBODIMENTS

Figure 1:
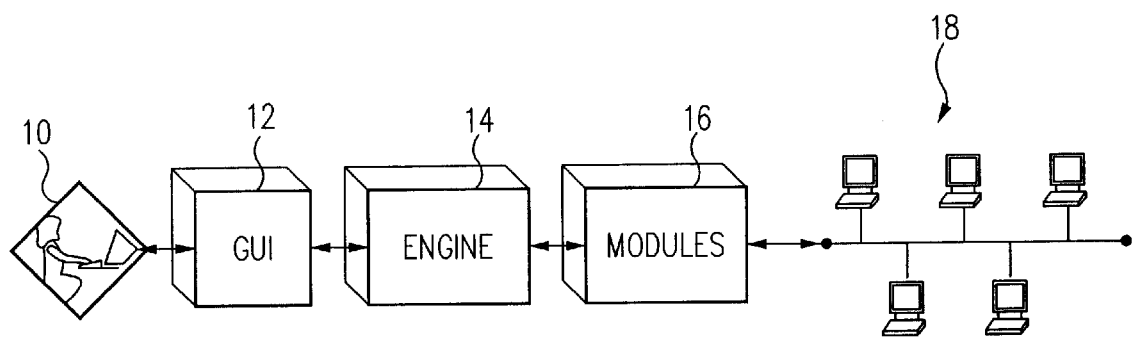
FIG. 1 shows a general overview of a penetration test system according to a preferred embodiment of the present invention.

In its most basic description, the present invention is a software program which performs automated penetration tests on a computer or computer network. The individual network resources that will be scanned include any device or node on a network that can be identified. Examples of common network resources are computers, printers, routers, and certain types of hubs. Since devices can be known to a network in multiple ways (one computer may have multiple IP addresses, a netbios name, and a NetWare name, for example), the number of network resources discovered by the present invention will generally be much greater than the number of physical devices connected to the network.

There are three basic logical components to the present invention: a user interface, a scan engine, and modules. In general, and as elaborated in more detail below, the user interface lets the user choose one or more penetration objectives, which constitute the desired purpose(s) of the test. An objective has, as its goals, gathering certain information about the network and/or using that information to gain access to certain network resources. An example might be obtaining access to a Windows NT domain name "XYZ." The modules are the components which will actually carry out the scanning of the computer or network in an attempt to achieve the selected objective. The scan engine is basically the controller, selecting and controlling the appropriate modules and overseeing the sharing of information among the modules. Achieving an objective usually will involve many iterations or interactions between the strategy, the scan engine, the strategy, the engine, etc. Sharing information among strategies allows each strategy to be more effective. By deciding which modules to run, the order in which to run them, and which information to share from one module to another, the present invention is able to discover vulnerabilities heretofore undiscoverable, by parlaying vulnerabilities found in one network resource into access to other systems.

In the following description, certain functions are assigned to specific ones of these three logical components, but it should be understood that functions may in practice be combined to form fewer or more such components. The preferred embodiment is not the only way to carry out the inventive concepts disclosed herein. Similarly, the software of the present invention can be embodied or programmed into one or more chips, on one or more portable machine readable media such as magnetic or optical diskettes, or in virtually any other data bearing record from which the software can be executed. Execution of the program is preferably done by a programmed microprocessor together with appropriate memory and input/output components which communicate through ports with the scanned computer and/or computer network. However, the invention can also be run or downloaded remotely, meaning that the software can be embodied as a computer data signal in a wired, optical, or over-the-air carrier wave.

Although not critical to the successful operation of the present invention, the scan engine preferably controls the modules so that various strategies are attempted simultaneously and independently to achieve an objective. This increases the efficiency with which ultimate results are produced. And as will become more apparent from the description to follow, the strategies can be throttled at different levels to allow for those that are more likely to achieve success to run earliest and at the highest speeds.

General Architecture

As indicated above, the present invention is preferably designed as three main components, a user interface or graphical user interface 12 (GUI), scan modules 16, and a scan engine 14, shown generally in FIG. 1. The scan modules 16 communicate with the computer or computer network 18 being penetrated, and a user 10 operates and observes the interface 12. The present invention can also be designed to automatically run predetermined objectives, in which case the user interface may be omitted or modified. For example, the present invention can be programmed to run a predetermined set of objectives every Saturday at noon.

Figure 2:
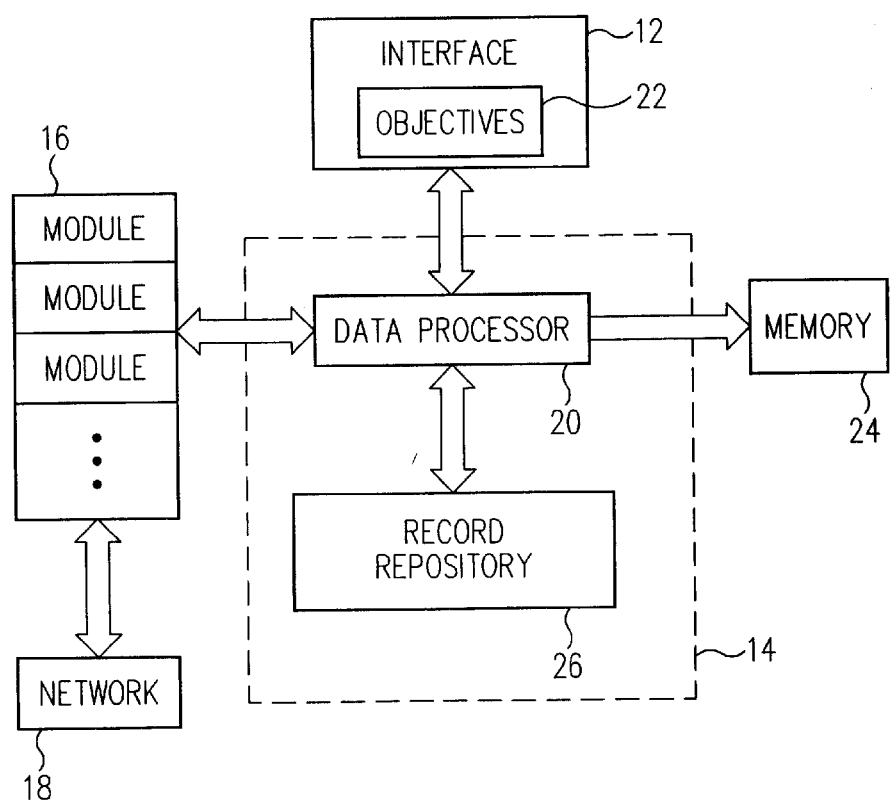
FIG. 2 shows a more detailed overview of the system interconnections according to a preferred embodiment of the present invention.

With reference to FIG. 2, which shows the general layout of the components of the present invention, the user selects the objectives 22 to pursue using the user interface 12. Based on these objectives, the scan engine 14 will decide which modules 16 to run, and the order in which to run them. The modules 16 interact with the network 18 and with the scan engine 14. If the modules 16 need preliminary information in order to run, then the scan engine 14 will retrieve appropriate input data records from memory 24 or preferably from a record repository 26. The input data records supplied to the modules 16 have predetermined record fields in a predetermined format. This format allows the scan engine to manipulate and monitor data to/from the various modules with ease. The modules 16 will later produce output data records with the information they obtain from their scan of the network, and supply these output data records to the scan engine 14. The output records are stored in the record repository 26 by the scan engine 14, and are preferably in the same format as the format of the input records. The output records are used to generate output reports to the user and also may be supplied, either as-is or after manipulation by the scan engine, to other modules as input records. This re-supply of output records to other modules as input records is one of the significant aspects of the present invention.

Records

In a preferred embodiment of the present invention, data is formatted in the form of data records. Records are the preferred data structure but other data structures can also be used. They are sets of data about the networks being scanned and/or about the objectives and modules used in the present invention, and are the way data is exchanged and stored. The record format is preferably used because it makes it easy to find certain pieces of data. Records are used to store both scan data from the modules and program configuration information.

A record is made up of one or more fields, formatted as shown in FIGS. 4 and 6–9. An example of a data record 70 preferably used in the present invention is shown in FIG. 6. It includes a record delimiter, for example the upper case letter "R," followed by one or more fieldnames and field values. The fieldnames can be almost any text, preferably short alphanumeric character strings in order to save memory space, and field values can also be any alphanumeric or other character string. In FIG. 6, the initial letter R is the delimiter indicating the start of a new record. This particular record has seven fields: Network Resource, Service, Protocol, Port, Miscellaneous, Command, and Severity.

After the R comes a space, which is followed by a field name (Network Resource) and then an equal sign (=). Immediately following the equal sign is the field delimiter. In the first field, the delimiter is a double quotation mark ("), but delimiters can be any character. This is true of any record used in the present invention. The delimiter must be a character that does not appear in the field text to avoid prematurely terminating the field. Note that the Miscellaneous field in the above example uses an exclamation mark (!) as its delimiter, since the field text contains a double quotation mark. After the first field delimiter is established, everything between it and the next appearance of the delimiter is considered the field value. After the end of field delimiter comes a space, optionally followed by another field name, and so on. As described below, modules must be able to both parse and produce records of whatever format is used.

Graphical User Interface

The graphical user interface 12 allows a user to specify what types of penetration probes or objectives to perform, and dynamically shows the results of a probe in progress. A main display on the interface 12 offers the user a selection of penetration objectives, perhaps in a dedicated display pane on the monitor. Objectives are preferably organized into a hierarchical tree such as that shown in FIG. 3 to allow related objectives to be run as a group. Parent objectives 32 are listed together with indented child objectives 34. The tree is loaded from a special file, herein called the Objective Configuration file, when the present invention is first opened. For example, referring to FIG. 3, a typical broad objective might be "Discover TCP/IP network resources." If selected, the user can be offered more specific objectives such as "Discover network resources that respond to ping," "Enumerate IP addresses in know IP networks," etc. The user can select these more specific objectives, or keep the broader objective selected. Running a parent objective preferably runs all of its children. The same Objective Configuration file or a different file may contain a description of each objective, which can be opened to learn more about the objective. The types of objectives that can be used are numerous and generally known to those of ordinary skill in the art, and therefore are not further elaborated herein. However, the number and type of new objectives that may be used in the present invention is limited only by the ability to create a module that can achieve it.

The interface 12 can be designed as a Windows-type of display for aesthetic purposes and to simplify the input and output of information from/to the user. It is preferable also for certain short-cuts be provided so that an unsophisticated user can use the present invention. "Tool bars" can be used for quick access to common functions, such as a "start" input to begin the penetration test and a "stop" input to interrupt it. As described in more detail below, the user is preferably given the option of selecting data files having prerecorded data records for use with the modules. These data files can contain initialization records or data records from prior penetration tests.

The interface 12 also provides some sort of output so the user 10 can learn the results of the test, be it final results or then-current results during a test. The output is preferably in the form of viewable information on a monitor but it can also be a printer, an audible output, a memory file for later retrieval, and/or any other type of applicable output(s). The then-current results are preferably updated during the penetration test, although a history of the test can also be output. Special outputs, such as graphics and/or sounds, can also demark certain key discoveries like new networks found or certain vulnerabilities. The interface can also present options to the user, such as the option of scanning a new network that has been found during the penetration test.

Examples of the interface's output include messages, descriptions or diagnostic information about the ongoing test; an indication of the level of security risk encountered, for example that certain portions of the computer network have high risk of breach, medium risk, or low risk (other levels or descriptors can also be used); vulnerability types classified into high, medium, and low risk groups; records generated by a scan, including both records with vulnerabilities and records without; and a progress indicator which shows scan progress. A record count can also show the total number of records generated during the scan thus far, and a scan timer can show the cumulative and remaining scan time (unless a continuous scan has been started, in which case only the cumulative scan time is shown). The scan engine, described below, can generate various statistics using a data processor and the data records generated during the scan.

Scan Modules

Scan modules 16 are the elements that perform all of the computer or computer network scanning. Each is a console application that can be run by the scan engine to probe the computer network, gather information about it and discover vulnerabilities. They do not communicate with each other directly, but rather report their findings to/from the scan engine. Their manner of operation is generally known to those skilled in the art, and basically includes transmitting certain data or queries to destinations in the network but their modularity is an aspect of the present invention. The destinations, data, and/or queries are educated guesses which hope to penetrate the network systems and to cause the network systems to reply with additional information. Some modules need information up-front before they can perform their job, while others begin with predetermined start information. The modules produce outputs based on their findings.

The present invention employs several modules, allowing it to run individual objectives more quickly by permitting only relevant scanning to be performed. The use of plural modules also allows a complete scan to run more quickly by performing many scanning operations in parallel. In the present invention, modules communicate with the scan engine using records as both their input and output. Records are units of data to be shared between modules. The scan engine's record repository 26 is a memory structure holding all records to be shared between modules, and a Filter is a set of information that specifies which records are passed to which modules. A data processor, also part of the scan engine, processes the records using the filters to determine which records should be passed to which modules. Inputs to a module and outputs from a module are handled in separate execution threads to allow for simultaneous execution of strategies.

A user selects the desired penetration objectives for the present invention to pursue, and it is the modules that are the applications which actually gather information about and discover vulnerabilities in a network. Most but not necessarily all objectives have commands associated with them. As described later, each objective's record in the Objective Configuration file has a "Command" field which names the module(s) that are to be run to achieve that objective. Modules exchange data records with the data processor 20 in the form of the mentioned records, and the data processor 20 in turn exchanges data records with the repository 26.

The following list describes exemplary modules used with the present invention. Each of these modules operates in a manner that is known in the art with the exception of the "Analyze" module, but they are modified to produce and receive data records in a uniform format, to be described later. Their modularity is also important for allowing them to work in parallel. Modifying existing modules to receive and produce data in the format described herein can be done, and is well within the level of ordinary skill of a software programmer so it need not be described in any detail. By making the format of the data records uniform and predetermined, it is possible for the scan engine 14 to perform its tasks with ease. For example, the records can be scanned for data in particular fields. The uniformity of the data records of the present invention also allows for new modules to be easily dropped into the program. Because the modules run independently of each other, they can be created separately without knowing anything about the internal software framework of the present invention. Adding modules is primarily a matter of manipulating their input and output structure to correspond with uniform data records as taught in this description, and how to add an entry in an objective-module cross reference file (such as the Objective Configuration file). The present invention runs the modules and sets up all of the input and output channels. Any name can be given to a module, and the extension ".exe" can be added to the module names if the invention is run on a Microsoft operating system, but the present invention is not so limited and can be used with other operating systems as well. The technical disclosures issued for each of the following modules are formally incorporated herein by reference:

Analyze—is used to examine Records to discover vulnerabilities not identified by other objectives. For example, Analyze can check port banners returned during a TCP/IP scan for a particular operating system (O/S) or service versions known to have particular vulnerabilities. Analyze uses the Analysis Record File (which contains analysis rules) to find vulnerabilities in records. New vulnerabilities can be discovered by adding records to the Analysis Record File. This module also reorganizes, extracts and deduces information from input records, creating new records for output. It can be used to identify vulnerabilities, operating systems, services, and other details about the network that are of interest to itself and other modules.

Crack Password—is used to crack encrypted passwords found by other modules. Crack Password uses a large dictionary and a small dictionary (both of which are preferably stored in memory), encrypts each of the words in the dictionary, then compares the result with any encrypted passwords found in the network being scanned. Any matches are output as vulnerabilities.

Resource Name—tries to discover the network resource name(s) associated with known IP addresses.

IP Address—tries to discover the IP addresses associated with known network resource names.

IP Address of Network Name—tries to discover the IP network address associated with known network names.

NetWare Version—determines if a network resource can serve NetWare file systems, and, if so, gets the NetWare version.

Ping—is used to discover IP network resources and to confirm that particular IP network resources exist.

Port Communication—is used to run tests against TCP/IP ports, such as smtp, using a script language.

RawICMP—listens for and retrieves packets returned from the network as the result of various things, such as ping broadcasts or errors resulting from TCP/IP operations.

Try Login—tries to use known usernames and passwords to log in to network resources that have the login service running.

ScanWhat—reads user input from the Scan What dialog box and turns it into records specifying networks and network resources the present invention can scan.

TCP Scanner—is a port scanner.

type—simply outputs the contents of a given file. Type is used to simulate a penetration scan by outputting the results of a previous scan to the program.

WNet Connect—tries to connect to WNet resources using all known login names and passwords in the data repository.

WNet Enumerate—enumerates WNet resources, just as the Windows Explorer and Network Neighborhood do.

Wnet Vulnerability—looks for several vulnerabilities using the WNet and Net APIs.

YP Finder—tries to discover nis or yp servers, which typically contain a large number of information databases (called maps) about a network, including encrypted passwords.

Among the strategies that are implemented by the scan engine upon its review of the user's choices, one strategy is preferably dedicated to an analysis of the data produced by the other strategies. This assessment strategy, named Analyze above, operates according to a series of rules, and is a very effective method for data reduction, permitting the design of the other strategies to be simplified. The data gathered by the various strategies, and/or as reduced by the assessment strategy, is preferably stored in memory in such a way that new data types can be stored and processed without all of the strategies having to be adjusted.

The Analyze module is run whenever one of the user-selected objectives is to "analyze results to determine additional vulnerabilities," or one that is similar in context. The Analyze module is like the other modules in that it communicates with the scan engine and not with the other modules directly. It sees the records gathered by other modules to see if they can be used to reveal vulnerabilities not searched for by those modules. For example, Analyze checks the contents of banners returned during port scans to discover particular operating systems (O/S), services, and their versions. Knowing an O/S or service and its version lets the present invention identify vulnerabilities unique to that configuration. The Analysis Record file is a configuration file used by the Analyze module to find vulnerabilities in the computer or network being penetrated. Analyze receives, from the scan engine, a copy of all data records from the other modules and uses the Analysis Record file to find specific data entries within those records. The Analyze module then produces a set of its own output records that are fed back to the scan engine for storage in the record repository and ultimately for use as input data records to one or more of the other modules. By knowing what each scan module is designed to find in the computer network, and what types of inputs the scan modules could use to help them along, the Analyze module is programmed to extract certain scan data records (or more accurately, specific fields from those scan data records) and to output records which, when fed to one or more of those scan modules, will help them achieve their goals.

The Analysis Record file is a collection of records (somewhat similar to the input and output data records) each of which specifies certain criteria that would make a scan data record a candidate for helping to find additional vulnerabilities. Each record in the Analysis Record file contains several fields, each field specifying something in the data record to require ("require criteria"), to look for ("include criteria"), to ignore even if the "include field" is found ("exclude criteria") and/or data extracted or derived from that data record to output to the scan engine if a candidate data record is found ("output criteria"). The Require criteria identifies something required and are checked for first, so that further processing can be avoided if not found.

The Include Criteria field specifies particular fields and/or values to search for in the data records. For example, one record in the File searches for the domain name service by searching the data records for records that have a "Service" field equal to "domain." Either the scan engine or the module which actually received the data record will assign a syntax to the appropriate field in the data record where the Include Criteria will search. An example of the Include Criteria in this example is:

R Include="R Service=!domain!"

meaning that the Analyze module searches the scan data records for "Service" fields matching the pattern "!domain!." These and other types of pattern matching are applied to the fields of incoming data records. Multiple Include fields can be added to a record in the Analysis Record File and all records that the Analyze module finds matching any of the Include Criteria are considered, i.e., multiple Includes are treated as OR propositions, not AND. Includes following the first matched Include are preferably disregarded, as only one matched Include is required for inclusion.

While Multiple Includes are treated as OR propositions, AND propositions can also be used in the present invention, and can be accomplished by including all of the matching criteria in a single Include. For example, R Include="R Network Resource=!*! Protocol=!TCP!". Additionally, the same field (Network Resource, for example) can appear multiple times within the same Include, providing the capacity of including based on multiple matches of the same field.

Exclude Criteria specify records that should be filtered out from those that match the Include Criteria. For example: If A is one of the Include Criteria, and B is one of the Exclude Criteria, then the Analyze module searches for (All records that match A)—(Any records that match B). This operates to filter out those scan data records which, although having data fields that are desirable, have others that automatically make them undesirable. In implementation, the Excludes are processed before the Includes, and no Includes need be examined if an Exclude is matched.

Output Criteria specify what type of record to output in the event that a match is discovered using the Include and Exclude Criteria. The Output Criteria tells the Analyze module which fields of the data scan records to output as an output record and what values those fields should contain. Output records are not limited to the fields and values contained in the input record.

In implementation, the preferred order of processing is: Require, Exclude, Include, Output.

The syntax of these several Analyze criteria can be defined using the following additional pattern matching conventions:

| | |
|---|---|
| !{Name}! | Can be used as part of the output criteria. Means to use the value stored in the Buffer named Name, or if the named buffer does not exist, to use the input value for the field called Name (input meaning a record that passes require, the include and exclude criteria) as a replacement for the {. . . } expression the output value for that field. |
| * | Multiple character wildcard, placed anywhere in a set of searched-for character(s). |
| ? | Single character wildcard, placed anywhere in a set of searched-for character(s). |
| [xyz] | The specified characters, but they can appear in any order. |
| [^xyz] | Must not include the specified characters. |
| \ | A literal character or set of characters to follow. |

An example of capturing into named buffers is {Buffer:Patte="a*z"}. This captures anything that would match the pattern a*z into a buffer called Buffer. If Buffer is used (i.e., without :Pattern=". . ."), then :Pattern=" . . . " is assumed. The contents of the buffer can be output by including {Buffer} in an output filed.

With regard to the syntax of the record entries, Field Value Delimiters such as the exclamation point (!) used in the above example are typically used to surround field entries. The delimiter can be any character that does not appear in the field value except that the opening and closing delimiter character is the same. This way, whichever character appears immediately after the equal sign (=) functions as the delimiter so that the scan engine treats everything from that character until its next appearance as a field value. The field delimiter can be any printable or viewable character.

A separate configuration file preferably used in the present invention lists network resources to exclude from penetration scans. The scan engine consults this file whenever it receives an output data record from a scan module, and excludes or filters out data records that have the criteria set forth in the exclude file. By filtering such data records out before they are added to the set of data records stored in the record repository 24, and/or before they are forwarded to a module as input data records, the present invention is able to avoid unnecessarily slowing key network resources during a penetration scan. An example of an "exclude" configuration file is:

R Network Resource="202.119.7.199"

This file specifies that any host using the specified IP address 202.119.7.199 should not be scanned even if it is specified by the user in response to a query from the user interface. For example, if the user selected 202.119.7.1–202.119.7.254 in response to a "Scan What?" query, to scan a class C network, and the above record were found in the "exclude" configuration file, then every network resource in that IP address range except 202.119.7.199 would be scanned.

The Objective Configuration File

The Objective Configuration File is another program configuration file that defines the objectives used in the present invention, how they map to modules, and how they work. Configuration files are text files that consist of records and are used in the present invention to define how certain parts of the program run.

The File is made up of the Records, each of which defines one objective. It is loaded when the program is started, and is used by the data processor to generate the objectives' hierarchical tree. Objective definition records preferably contain the following fields: Name, Parent, Command, Met, and Filter, as shown at 40 in FIG. 4. Throughout this description, whenever a field is said to be omitted, it can mean that the field is altogether not present or that the field is present but empty.

With reference to FIG. 4, in the Objective Configuration File the "Name" field is the name of the objective as it appears in the objective tree.

"Parent" is the objective's hierarchical parent or parents. Objectives can appear multiple times in the tree, which is accomplished by including multiple Parent fields in the File. A "Child" field can also be used as a similar way to lead the scan engine to additional objectives. Because running a parent objective preferably runs all of its children, the scan engine will look at this field to determine the list of objectives to run.

The "Command" field specifies the module(s) that is to be run whenever this objective is selected. Not all objectives run modules, so some will not have a Command field (or will have an empty Command field). The Command field may also include any relevant parameters and switches, as described in more detail below. These parameters and switches help further define how the designated module will carry out its operations.

The "Met" field designates the criteria by which this objective is satisfied. By knowing what it takes to satisfy this objective, the scan engine is better able to predict other objectives that will need the output data record of the named module(s).

The "Filter" field in the Objective Configuration File includes the criteria by which data records are selected as inputs for the module run by this objective. The scan engine will review all data records present in the Record Repository, including data records that are present there upon Scan Commencement of the present invention (if any) and data records that are produced by the modules. Alternatively, the scan engine can be designed to scan only a subset of those data records. If the scan engine finds a data record having the criteria set forth in this Filter field, then the data record is forwarded to the module appearing in the "Command" field for use as an input data record. Only objectives that run modules can have a Filter field, but a Filter field is not required. If no filter criterion is specified, then all records in the data repository, or in the subset, are sent to the module.

The Objective Configuration File can also have "Try" and "Try If" fields, which identify additional objectives to be run when this objective is run. The additional objectives under the "Try If" field will be run only under certain conditions, while those under the "Try" field will always be run. These fields are optional, but add to the power and effectiveness of the present invention. The "Try" and "Try If" fields provide the present invention with a system of objective dependency to ensure that enough data is generated to permit an objective to function. For example, in order to discover whether an SMTP "vrfy" feature is enabled, such as a smtp address or user verify, the present invention must first discover smtp servers. Objective dependency as defined by the "Try" and "Try If" fields refers to other objectives that may help in the task. Objectives in the "Try If" field are run only if there is no useful data in the data repository.

The "Command" field of the File can also include module parameters and switches. These can also be separate fields, but however configured they provide supplemental information about how the module is to run. The parameter field may provide an initial set of input data that the module named in the Command field should use to start with. Although a module can be used for several objectives, and thus be named in several objective records in the Objective Configuration File, it can be run with different parameters for each objective based upon the parameter set in the Command field.

Some modules may require specific, additional parameter fields if they always need a certain piece of information. A "Ports Parameter" is an example, and can be a dedicated parameter used for the TCP Scanner module and modules similar to it, which must be told which port(s) to scan. The parameter identifies these port(s). The syntax can be: TCP-Scan {ports1 ports2 . . . portsn}. Each port specification can be a single port, a range of ports (first and last, separated by a hyphen), or a well-known port name (ftp, http, etc.), each separated by a space. Other dedicated parameter fields can be used in the present invention, depending on the information needed by the modules.

The switches included in the Command field indicate additional information about the module's input and/or output. For example, a "message" switch can be used to control how much information returned by a module is to be forwarded as a Message output to the user interface 12. Syntax for such a switch can include the character string: –m {level} in the Command field. The "level" parameter here can designate the level of detail that the module's results must have in order to be forwarded to the message output. The scan engine will see the message switch, determine whether the information in the module's output data record meets the criterion, and if so, provide the appropriate error/diagnostic data from the output data record to the message output on the user interface together with whatever additional textual explanation the user may need to understand what is being shown.

Another switch that may be included in the Command field of an objective's record in the Objective Configuration File is an Input Switch. This switch is used to feed the contents of a specific file to a module, much like a memory pointer, instead of specifying the actual input data as can be done by the "parameter" field. The file may be a data record in the record repository 26, or a file kept elsewhere in memory 24. An example of the syntax used for the input switch can be: –i {filename}, where the filename includes the name and path of the file.

Some modules used in the present invention may have dedicated switches if they have particular operation requirements. For example, the module "TCP Scanner" performs port scans according to a particular set of operations know to those in the art. For this module, the present invention provides a "Banner Switch" which tells TCP Scanner to read the service banner upon a successful connect to a port. The syntax can be: –b.

Other switches can also be used in the present invention to increase its versatility and to facilitate the scan engine's interaction with the modules.

A scripting module is also preferably used, which provides a standard scripting interface for communicating interactivity with services and network resources, independent of protocol.

The Scan Engine

The scan engine is responsible for overseeing the entire penetration test and directs the flow of information through the program. Referring again to FIG. 2, the scan engine 14 includes a data processor 20, the record repository 26, and agents that monitor inputs/outputs of the modules. The data processor 20 together with the record repository 26 form one of the cores of the present invention.

The scan engine 14 translates the user-selected objectives 22 into a list of executable modules using the Objective Configuration File. The translation can also result in the pursuit of objectives which, though not specifically identified by the user, would nevertheless aid in supplementing the penetration scan. For example, the user may opt for penetrating a specific type of port, and the scan engine would decide also to pursue other types of ports because of their similarity, or perhaps because those other ports may provide information useful in penetrating the user-selected port. All information needed for the scan engine 14 to decide which modules to run is contained in the Objective Configuration File, as described above.

The data processor 20 is driven by program files contained in memory. The programs instruct the data processor 20 to carry out the functions disclosed herein. According to a preferred embodiment of the present invention, the processor receives data from the modules in the form of data records, and using Exclude configuration file filters and/or other filters described above decides whether that data should be added to the repository. It checks for duplicate records, and does not add duplicates to the data set. The filter field in the objective's record in the Objective Configuration File is also used by the data processor 20 to decide which records in the data repository 26 should be sent to which modules. The Filter field may, in a less preferred embodiment, also check for duplicate information.

The data processor 20 is also used by the present invention to analyze the data produced by the scan modules upon scanning a computer or computer network. Even if only one objective is run by a user, several other modules may be run by the data processor to provide the necessary data for that objective and perhaps for similar or related objectives. With the help of Analyze module described above, the scan engine is able to generate comprehensive results of the penetration test.

As for controlling the operation of the modules 16, the scan engine 14 preferably starts the selected modules in parallel. When multiple penetration objectives are run, their modules are all run in parallel (to the extent possible), producing records that are fed into the record repository. Some modules can run right away, either simultaneously or in a time multiplexed manner, because their initial start information is either available or predetermined, while other modules must first await the results from others. The data obtained by the modules is output in the form of a record to the data processor 20. The present invention stores the data records in the record repository 26, which is the central information point for all operations executed by the present invention. As seen in FIG. 2, the repository 26 is linked to the data processor 20 by a bidirectional interface. The outputs to the user interface 10 are also generated using information from the repository 26. The organization of the records in memory is not important because most accesses to the repository 26 will look for particular fields within the data records, rather than looking for specific addresses.

When any records useful to a particular objective, as defined by its Filter field in the Objective Configuration file, are added to the data set in the repository 26, the data processor 20 feeds them to that module. In order to avoid forwarding records prematurely, the data processor 20 may await a signal from the module 16 that it needs the input data record. If there is no filter field for a given objective 22, then all data records are by default considered useful to it and forwarded to that objective's module(s) 16. The fact that objectives run simultaneously, feed data into a common repository, and can draw out useful information from that repository, permits the present invention to probe a network in a very thorough way, and in a very short amount of time.

The scan engine 14 also prioritizes execution of various strategies by looking at the amount of time that the vulnerability checks of each module will take. For example, if a particular module 16 only performs a brief vulnerability check per network resource, then that module 16 will be able to process quickly all of the network resources passed to it. By executing this module first, other modules will be able to take advantage of its information rather soon. Conversely, if a module 16 will perform many operations then it will take a lot of available processing time to process each network resource passed to it and it will starve other modules for data. It is advisable for the scan engine to delay such a module until other modules have been executed.

It is preferable, and more time efficient, to have the modules run in parallel. By coordinating the scan engine and modules such that they provide the most effective balance between resource consumption and results, the learning and feedback of the present invention is increased. If you try to do too many time consuming vulnerability checks in one module, undesirable delays can result. Optimum execution goals rely on running checks that are likely to achieve success quickly. The modular design of the present invention allows optimum results to be obtained by keeping the modules simple and uncomplicated. A useful (though not mandatory) module creation guideline is that each module should perform one step. The engine takes care of moving records from one step to another to complete the scan.

Another way to prioritize scan modules is to build options into the module that allow it to run slower or faster depending on what is needed. For example, the TCP Scanner module is run from several different objectives. This module allows TCP port scanning to take place. Among the parameters it needs to receive are the range of ports to look for, and how many ports to look for simultaneously. If one objective only wants to look at a small number of ports which are known, then the "parameters" field of the objective's Objective Configuration File can so indicate. Modules need not be run until there is input available for them, so the scan engine can use the filter field to decide whether and when to run a given module. As a third prioritization rule, with regard to the number of ports needed by a module to conduct its scan, the scan engine can give priority to a module that will use only a small number of ports over a module that will use a larger number of ports. This enables more modules to go to work at the same time.

As an example of the operation of the present invention, a prior art network probe might perform the following independent steps:

1. Locate Windows95 systems that are sharing files to the network in a particular way. Report this as a vulnerability.

2. Locate systems that allow access through the login TCP/IP service. Try several common login names and passwords to attempt access. Report the availability of the service as vulnerable for any of the login names and passwords that work.

The present invention would perform similar steps, but with sharing between them:

1. Locate Windows95 systems that are sharing files to the network in a particular way. Report this as a vulnerability. Use the SMB protocol to obtain .PWL files, and decrypt them to obtain network passwords.

2. Locate systems that allow access through the login TCP/IP service. Use the network passwords obtained by the module used in step 1 to attempt access. Try several common login names and passwords to attempt access. Report the availability of the service as vulnerable for any of the login names and passwords that work.

This example is a simple one because it describes only one additional "level" of penetration, i.e., using the data gathered by one vulnerability to discover another, but the present invention can be used to perform much more complex vulnerability checks. Two, three, four, or more levels of additional penetration attempts are possible with the present invention. The present invention also allows a module to process new data. This is done by continually scanning the "filter" field of the objectives to be run, each time that a new data record is received from a module. A module can be executed multiple times but module startup can be time consuming, so it is preferable to process plural data records through a single execution of the module.

What Happens During a Scan

Figure 5:
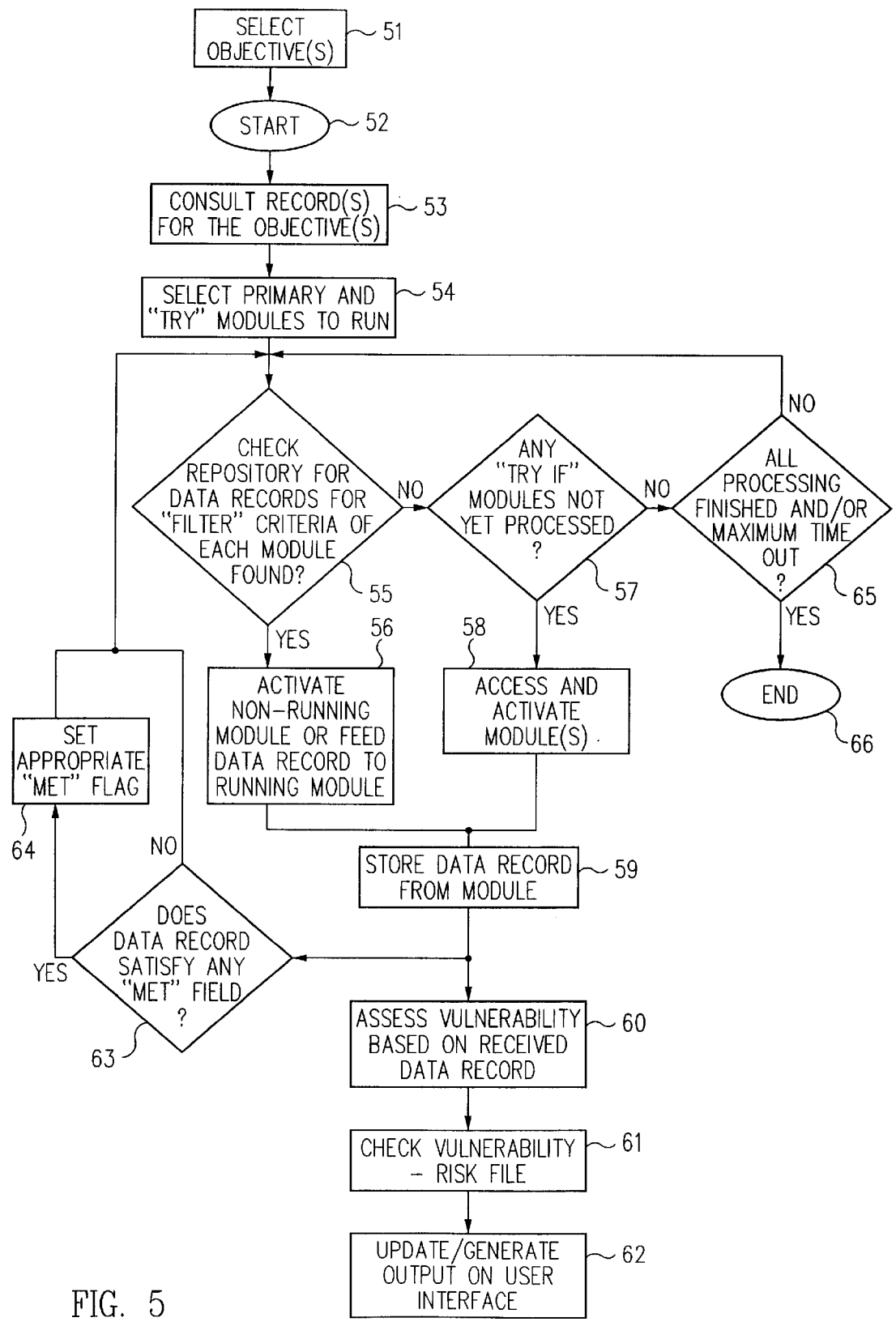
FIG. 5 shows a flow chart for the processing of a scan engine according to an embodiment of the present invention.

An example of what happens during a scan, with names of files, objectives, etc., in quotation marks, is presented here together with FIGS. 4 and 5. Initially, in step 51 of FIG. 5, a user looks over the penetration options displayed on the user interface 10, and selects one or more which sets forth desired objective(s). In this example, the option is called "Discover Network Resources that Respond to Ping." (FIG. 3). The user then selects the "start" option to run the penetration test. See step 52.

The scan engine 14 examines the record associated with this objective in the Configuration File, which in this case is shown in FIG. 4. See step 53.

In FIG. 4, the R designates the start of a record. The Name field indicates that this record corresponds to the option selected by the user, namely "Discover Network Resources that Respond to Ping."

The Parent Name indicates the level above the selected option, as contained the hierarchical tree stored in the Objective Configuration File.

The Command field exists, and designates "Ping." This tells the scan engine that the "ping" module needs to be activated for this objective. See step 54. If the Command field had designated additional modules, or if the user had selected additional objectives, then the scan engine would also activate the corresponding modules.

The "Filter" field calls for "R Type=!IP host!," meaning that the "ping" module should receive any data records prerecorded, currently present, or arising in the future in the record repository that have a "Type" field containing the identifier "IP host." (The Type fields are explained elsewhere in this disclosure.) This is because only IP network resources, as opposed to other protocols such as netbios, can be "pinged." See step 55.

The "Try" field recommends an additional objective(s) that may be useful in reaching the objective of the "Command" module, and/or that may give results that are related to or perhaps supplement the objective of the "Command" module. Since the accessed record in this case has a "Try" field, the present invention runs that objective, too (see step 54), which in FIG. 4 is "Extract information from icmp packets." This objective might run the "RawICMP" module. If that module's "filter" information exists in the record repository, or if no filter field exists, then the module is run right away. See step 56. The present invention is designed to run this additional objective because icmp is the protocol used by ping, and by any information returned as a result of a ping.

If during execution of the modules the present invention determines that no records meeting the "Filter" criteria are present in the record repository, step 55, then it will examine the "Try If" field, step 57. The Try If field contains a backup objective which may be useful to the penetration test. In FIG. 4 the backup objective is "Discover TCP/IP network resources." This objective may cause the user interface to pose a query to the user, such as "Scan What?" If the user does not specify anything particular to scan and instead responds with an "OK" or if a time out occurs with no user input, then the present invention begins searching for network resources by sending out a "ping" broadcast, and will proceed with other scan modules. If the user does specify a particular network, or domain, or host, etc., then the present invention uses that input information or attempts to resolve the given information into IP addresses so that the scan can proceed. If there are Try If objectives, then their module(s) are accessed and activated. See step 58. If not, then the penetration test checks whether all modules' goals have been met, and/or other requirements for terminating step 65.

In an alternative embodiment, the Scan What module can perform predetermined scans, such as finding out whether certain systems exist in the computer or network being scanned, and will pose queries to the user such as "We found X system. Do you want to see if we can penetrate it?" Depending on the choice(s) of the user, the system then applies further modules to the X system based on the type of system, characteristics that the system likely has, etc.

The "ping" broadcast will cause a response from the network being scanned. If the Ping module sends out broadcasts to several types of resources, then several responses may be returned. The responses are heard by other modules which are listening, such as RawICMP, which produce a data record that is stored by the data processor 20 into the record repository 26. See step 59. This data record can be stored as-is, or it can be further processed by the scan engine into a different data record (or even deleted) according to the various filters, such as the exclude filter, and/or according to data analysis module(s). Other modules that are running may be handed the results of the ping broadcast by the data processor, steps 55 and 56, and outputs records about any network resources discovered (step 59).

As soon as any records with the field and value "Type=!IP Host!", which is the Filter criteria in this example, are added to the record set in the record repository (step 59) those records are passed by the data processor 20 to the Ping module (steps 55 and 56), and then Ping starts pinging those network resources to verify that they exist. If any network resources respond to the pings sent out by the Ping module, then a vulnerability record is generated (step 60) and either stored in the record repository 26 or elsewhere in memory 24. The vulnerability record may be a record with the field (Vulnerability="responds to ping").

If any records containing vulnerabilities are produced, then the present invention checks a vulnerability-risk file (step 61) to access the risk value assigned to that vulnerability. Outputs to the user interface can also be generated at this time. See step 62. For example, any record produced by any of the running modules that contains a vulnerability field is displayed in a data table, and a visual graph is updated to reflect the changed vulnerability count.

The new data record received from a module may satisfy an objective's "Met" field. See step 63. The "Met" field indicates what is required to meet the objective of the listed module(s). In the example given above, when a data record is generated with the vulnerability field designation "responds to ping," the objective is met. The present invention allows different requirements to be entered for the "Met" field, meaning that if the user selects one objective, then the module can be run until "X" happens, and if the user selects a different objective, then the same module, which would appear in a different record in the Objective Configuration file, can be run until "Y" happens. The versatility of allowing the same module to be run until different criteria are met, depending on a user's selected objective, is another of the advantages of the present invention. This does not necessarily mean, however, that the module is terminated once "met" criteria are found. Instead, a module is preferably run until there are no more data records waiting to be sent to any module, and no modules are still processing data records (or when a maximum scan time has elapsed). See step 65. As another example, a "Discover smtp servers" objective may contain the following "met" criterion:
Met="R Vulnerability=!smtp service enabled!"

This means that scan data records having a Vulnerability field with the value "smtp service enabled" satisfy the objective. Typically, a plurality of data records will satisfy a given objective, so the module need not terminate once the first satisfying record is found. It may be run until a predetermined number, say three, of satisfying records are found, or until no more input data is forthcoming, or until a predetermined event occurs, such as a time out.

When an objective has been satisfied during a scan, a visual, audible or other indication to that effect can be output to the user, as can the highest risk value of the satisfying record(s). See step 64. In addition, the data processor can set a flag so that it knows that module(s) "X" has been satisfied. In this example, "responds to ping" has a risk value of 15 as defined in the vulnerability-risk file, on an exemplary scale of 0–99, so the corresponding output to the user will reflect only a low risk of breach.

Once all of the "Met" fields are satisfied, and/or all "Try" and "Try If" objectives (if any) have been processed, and/or all other processing is finished the penetration test ends. See step 66. At this stage, the scan engine can produce final output information to the user interface. The Analyze module, which preferably has been running throughout the penetration test and hopefully contributing additional records to the record repository, can also be used at the end of the penetration test to produce the final output information.

Based on the processing of the present invention, the data output by modules in the form of scan data records, are recycled as input data to accomplish their purposes of gathering information and/or discovering vulnerabilities. Objectives rely on one another to produce that data, which is where the scan engine's oversight of the penetration test plays a significant role.

Vulnerabilities

The present invention's ultimate goal is to discover network vulnerabilities. Vulnerabilities are ways an attacker can gain unauthorized access to a network, steal or destroy data, or deny service to legitimate network users. During a penetration scan, the output is constantly updated with new vulnerabilities that are discovered, and to show the number of low, medium, and high risk vulnerabilities. The output reports generated by the scan engine's data processor 20 can summarize vulnerabilities and list vulnerabilities per network resource and network resources per vulnerability. The vulnerability-risk file helps assess the risk, using an exemplary risk scale from 1–100 (or 0–99), and optionally can give hints on how to cure them.

Adding Modules

Because of the way the present invention is designed, modules run independently of the program. This means that new modules can be added with relative ease.

Adding a new module to be run from the present invention is accomplished by first creating the module. The module is an independent, executable console application designed to probe a network. The module must be able to parse the record format and produce data records, accept data records as standard inputs and create data records as standard outputs. Error text messages should also be produced by the module.

In order for the present invention to run a module, there must be a corresponding objective that calls the module. This means that a objective's record in the Objective Configuration File must have a Command field that names the module. Objectives are defined by records in the File as described earlier herein. FIG. 7 shows a hypothetical record 72 in the Objective Configuration File that runs a module called oof.exe. It creates an objective, gives it a name ("Discover systems vulnerable to latest NT exploit" in the Name field), specifies its place in the objective tree (its parent is "My company's custom vulnerabilities" in the Parent field), identifies the module to run ("Oof" in the Command field), indicates which records from the record repository should be sent to the Oof module ("Type= !WNet!", in the Filter field), specifies what types of records satisfy this objective (when vulnerability is "latest exploit possible" in the Met field), and specifies that the "Discover Windows network resources" objective should be run if there are no records in the record repository 26 useful to the Oof objective (in the Try If field).

The final piece for adding a module is to record its risk value. If the new module is designed to produce records that contain vulnerabilities, then the risk value of the vulnerability must be defined by adding a record to the vulnerability-risk file. This is easily done by adding a new entry together with the estimated risk level associated with the vulnerability that the module seeks to find. The entry in the vulnerability-risk file can be, for example, R Risk="59" Vulnerability="latest exploit possible".

More on Records

Having described the organization and operation of the present invention, additional information is provided on the records which are preferably used. FIG. 8 shows another sample record 80 from the Objective Configuration file. It includes the Name, Parent, Command, and Met fields, and several Try If and Filter fields. Also shown is a "Sound" field which informs the data processor of the type of output that is to be produced when the objective is met. In this case, an audible "applause" sound wave will be played.

The second example of FIG. 9 shows a scan data record 90 produced by a module 16 or alternatively by the data processor 20. It identifies the computer network resource that was scanned by the module, the protocol of that network resource, the network port on which the scan was performed, a miscellaneous field which here indicates the time of successful access by the module, the command (module) that carried out the scan, and the level (here, zero) of security risk severity. These are simply examples of the types of records that can be used with the present invention. Those skilled in the art, upon reading this disclosure, will recognize that other data structures and/or formats can also be used in order to implement the inventive concepts disclosed herein. Such alternative structures and formats are considered to be encompassed within the teachings of the present invention. For example, if records are used as the data structures, then the field names can be any text, including spaces. Note that in FIG. 8, some of the field names are one word (Name, Parent, Command, etc.), but one is two words (Try If).

The field values can be any text enclosed between field value delimiters. It is likely, as shown in the examples of FIGS. 8 and 9, that the field value will identify a record. Field delimiters must be followed carefully to avoid confusing a field identifier with a field value that is a record. The field value delimiters can be any character except that the opening and closing delimiter character must be the same. Whichever character appears immediately after the equal sign (=) functions as the delimiter, so that the scan engine treats everything from that character until its next appearance as a field value. In FIG. 9, the Command field uses an exclamation point (!) as its field delimiter rather than a double quotation mark ("), because the field value itself for that field contains a double quotation mark ("). For the structure used in the preferred embodiment, the equal sign (=) between the field name and field value is needed, as is the space between fields. The records themselves have delimiters in the record repository. Each record begins on a new line with an uppercase R followed by a space.

Some data records produced by the modules will include a Vulnerability field, which means that the information contained in the data record reveals a security vulnerability discovered by the module. In the preferred embodiment, vulnerabilities are assigned a risk value on a scale of 1–100, with 1–33 being low risk, 34–66 being medium risk, and 67–100 being high risk. Each system's risk and/or a collective risk profile for the penetration test can be displayed to the user on the user interface. Of course, not all data records contain vulnerabilities. The present invention uses some modules simply to gather large amounts of information that do not represent any security threat, but which can be used by the same or other modules to discover security threats.

Regardless whether the data records are ultimately used to generate output data for the user, it is preferable for the present invention to retain all data records produced by a module's scan of the network so that a profile of the scan can be reproduced. The data gathered during a scan can be saved to a separate memory file for later examination or analysis. In this case, the data is stored as a set of records, and all of the records generated by the scan are saved. Similarly, the present invention allows the record repository to be loaded with data records from a separate file. This file can be the saved set from a prior penetration test, or a set of initialization records to be used as input data records for the modules.

Statistics

Because the present invention is designed to track and store data records produced by the scan modules, numerous statistics about the penetration scan can be generated and provided on the user interface 10. For example, the total number of records received by a module or objective can be monitored to evaluate the success or failure of that objective, as can the number of records filtered out during processing; the number of records stored to the repository for each module or objective; the number of records sent (or not sent) to a module; the number and identity of duplicate records; the number and identity of newly found networks to scan which the user was presented with and chose not to scan; etc.

The records in the record repository permit the present invention to produce, at virtually any time during and after a penetration scan, a report of the information gathered to that point. Reports can contain a high level summary of the scan; a chart showing the number of high-, medium-, and low-risk vulnerabilities; an index of network resources discovered; a list of network resources along with all vulnerabilities associated with that resource; an index of vulnerabilities discovered; a list of vulnerabilities along with all resources found to have that vulnerability; the objective tree, along with the number of times each objective was met.

The invention having been thus described, it will be obvious that the same may be varied in many ways, not only in construction but also in application. Such variations are not to be regarded as a departure from the spirit and scope of the invention, but rather as modifications intended to be encompassed within the scope of the following claims.

what is claimed is:

1. A computer network penetration test system including at least one software medium having software recorded thereon, the software comprising:
    a plurality of scan modules for scanning a computer to learn vulnerabilities that the computer has to unwanted access, at least one of said scan modules producing an output based on a scan of the computer;
    a controller for instructing said one scan module to perform a scan of the computer and to produce an output, and for producing an input to another of the scan modules based on said output.

2. The system of claim 1, wherein said scan modules scan the computer independently of one another.

3. The system of claim 1, further comprising a memory for storing outputs from said scan modules, said controller retrieving said outputs from said memory and forwarding data from said outputs to said scan modules.

4. The system of claim 1, wherein said input produced by said controller is identical to said output from said one scan module.

5. A computer network penetration test system including at least one software medium having software recorded thereon, the software comprising:
    a plurality of scan modules for scanning a computer to learn vulnerabilities that the computer has to unwanted access, at least one of said scan modules producing an output based on a scan of the computer;
    a controller for instructing said one scan module to perform a scan of the computer and to produce an output, and for producing an input to another of the scan modules based on said output; and
    a user interface operatively connected to said controller for allowing a user to input a desired network penetration objective, wherein said controller selects said plurality of scan modules from a set of available scan modules based on the input penetration objective.

6. A computer network penetration test system including at least one software medium having software recorded thereon, the software comprising:

a plurality of scan modules for scanning a computer to learn vulnerabilities that the computer has to unwanted access, at least one of said scan modules producing an output based on a scan of the computer;

a controller for instructing said one scan module to perform a scan of the computer and to produce an output, and for producing an input to another of the scan modules based on said output;

a user interface operatively connected to said controller for allowing a user to input a desired network penetration objective, wherein said controller selects said plurality of scan modules from a set of available scan modules based on the input penetration objective; and an objective configuration file for each respective penetration objective input by the user, said objective configuration file identifying at least one scan module needed to achieve the corresponding penetration objective, wherein said controller selects said plurality of scan modules by accessing objective configuration files corresponding to the input penetration objectives.

7. A computer network penetration test system including at least one software medium having software recorded thereon, the software comprising:

a plurality of scan modules for scanning a computer to learn vulnerabilities that the computer has to unwanted access, at least one of said scan modules producing an output based on a scan of the computer;

a controller for instructing said one scan module to perform a scan of the computer and to produce an output, and for producing an input to another of the scan modules based on said output;

a user interface operatively connected to said controller for allowing a user to input a desired network penetration objective, wherein said controller selects said plurality of scan modules from a set of available scan modules based on the input penetration objective;

an objective configuration file for each respective penetration objective input by the user, said objective configuration file identifying at least one scan module needed to achieve the corresponding penetration objective, wherein said controller selects said plurality of scan modules by accessing objective configuration files corresponding to the input penetration objectives; and wherein at least one of said objective configuration files identifies an auxiliary objective to pursue, and said controller accesses an objective configuration file corresponding to the auxiliary objective, said set of scan modules including a scan module identified in said objective configuration file corresponding to the auxiliary objective.

8. A computer network penetration test system including at least one software medium having software recorded thereon, the software comprising:

a plurality of scan modules for scanning a computer to learn vulnerabilities that the computer has to unwanted access, at least one of said scan modules producing an output based on a scan of the computer;

a controller for instructing said one scan module to perform a scan of the computer and to produce an output, and for producing an input to another of the scan modules based on said output;

wherein said input produced by said controller is identical to said output from said one scan module; and wherein said output from said one scan module is a data record having fields, each of said fields identifying at least one piece of information about the scan performed by said one scan module.

9. A method of performing a penetration test on a computer network, comprising:

(a) performing a first computer network scan to gather information about a secured network resource in the computer network;

(b) performing a second computer network scan to gather information about a second secured network resource in the computer network; and (c) automatically sharing output data from the first computer network scan with the second computer network scan.

10. The method of claim 9, further comprising:

(d) performing a third computer network scan to gather information about a third secured network resource in the computer network, said step (d) being performed at the same time as at least one of said steps (a) and (b).

11. The method of claim 10, wherein the third network resource is the same resource as the first or second network resource.

12. The method of claim 10, wherein the third network resource is not the same resource as the first or second network resource.

13. The method of claim 10, wherein each of said steps (a), (b), and (c) is performed from a location remote from the computer network being scanned.

14. A method of performing a penetration test on a computer network, comprising:

(a) performing a first computer network scan to gather information about a secured network resource in the computer network;

(b) performing a second computer network scan to gather information about a second secured network resource in the computer network;

(c) automatically sharing output data from the first computer network scan with the second computer network scan; and prior to said steps (a) through (c):

(d) selecting at least one objective for the penetration test; and (e) determining, based upon the at least one objective, a set of scan modules to use during the penetration test, the set of scan modules including first and second modules for respectively performing the first and second computer network scans of steps (a) and (b).

15. An article of manufacture bearing a machine readable program for carrying out the steps of:

scanning a computer network using a plurality of scan modules; and automatically sharing information from at least one of the scan modules to at least one other of the scan modules.

16. The article of manufacture of claim 15, wherein said scanning step includes performing simultaneous and independent scanning of the computer network by at least two of the scan modules.

17. The article of manufacture of claim 15, wherein said step of automatically sharing information includes passing an output data record as-is from one of the scan modules to another of the scan modules.

18. An article of manufacture bearing a machine readable program for carrying out the steps of:

scanning a computer network using a plurality of scan modules;

automatically sharing information from at least one of the scan modules to at least one other of the scan modules; and wherein said step of automatically sharing information includes modifying contents of an output data record from one of the scan modules to form a modified data record, and passing the modified data record to another of the scan modules.

19. A computer network penetration test embodied in at least one carrier wave comprising:
 a plurality of first signal segments constituting scan modules for scanning a network resource on a computer network to learn vulnerabilities that the network resource has to unwanted access;
 a second signal segment defining instructions for one of the scan modules to perform a scan of the computer network and to produce an output based on the scan, and for producing an input to an other of the scan modules based on the output.

20. A computer network penetration test embodied in at least one carrier wave comprising:
 a plurality of first signal segments constituting scan modules for scanning a network resource on a computer network to learn vulnerabilities that the network resource has to unwanted access;
 a second signal segment defining instructions for one of the scan modules to perform a scan of the computer network and to produce an output based on the scan, and for producing an input to an other of the scan modules based on the output; and
 a third signal segment constituting instructions for formatting the output in the form of a data record having a plurality of data fields, and for formatting the input to the other scan module in the form of a second data record having a plurality of second data fields.

21. A software medium having software recorded thereon, the software written to be executed by a processor, for procuring information relating to access of a secured computer system for any purpose whatsoever, the software comprising:
 a first set of machine readable instructions for attempting to determine a first item of information relating to access of the secured computer system;
 a second set of machine readable instructions for attempting to determine a second item of information relating to access of the secured computer system; and
 information sharing instructions for making the first item available for use by the processor during execution of the second set of machine readable instructions.

22. The software medium of claim 21 wherein the second set of machine readable instructions can be executed in absence of the first item.

* * * * *